US009417986B1

(12) United States Patent  
Bates et al.

(10) Patent No.: US 9,417,986 B1
(45) Date of Patent: Aug. 16, 2016

(54) SYSTEM LIBRARY ERROR CLASSIFICATION IN A CLOUD BASED DYNAMIC ANALYSIS TOOL

(71) Applicant: International Business Machines Corporation, Armonk, NY (US)

(72) Inventors: Cary L. Bates, Rochester, MN (US); Lee N. Helgeson, Rochester, MN (US); Justin K. King, Rochester, MN (US); Michelle A. Schlicht, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/006,779

(22) Filed: Jan. 26, 2016

(51) Int. Cl.
    *G06F 11/00* (2006.01)
    *G06F 11/36* (2006.01)
(52) U.S. Cl.
    CPC ........ *G06F 11/3612* (2013.01); *G06F 11/3608* (2013.01)
(58) Field of Classification Search
    CPC .................. G06F 11/3608; G06F 11/3612
    See application file for complete search history.

(56) References Cited

U.S. PATENT DOCUMENTS

| 7,962,901 | B2 | 6/2011 | McCamant et al. |
| 8,265,976 | B2 | 9/2012 | Fitterer et al. |
| 8,776,036 | B2 | 7/2014 | Das |
| 8,935,673 | B1 | 1/2015 | Ashkenazi et al. |
| 9,311,217 | B2 * | 4/2016 | Krauss ................ G06F 11/3612 |
| 2004/0199815 | A1 * | 10/2004 | Dinker ................ G06F 11/3428 714/21 |
| 2009/0328004 | A1 | 12/2009 | Balasubramanian |
| 2011/0145650 | A1 * | 6/2011 | Krauss ................ G06F 11/3604 714/38.1 |

OTHER PUBLICATIONS

Dr. Memory, "Running Dr. Memory: Dr. Memory as a Visual Studio Tool," downloaded from <http://drmemory.org/docs/page_running.html#sec_potential_errors> on Dec. 22, 2015, 4 pages.

* cited by examiner

*Primary Examiner* — Joshua P Lottich
(74) *Attorney, Agent, or Firm* — Patterson + Sheridan, LLP

(57) ABSTRACT

Techniques are disclosed for classifying system library errors detected by a dynamic analysis tool executing in a first client of a plurality of clients. The dynamic analysis tool monitors an execution of an application. The dynamic analysis tool identifies one or more errors that are related to at least one of a plurality of system libraries called by the application during the execution. For each identified error, the dynamic analysis tool evaluates the error relative to error data observed in a dynamic analysis tool executing in the other clients, and flagging the error as an error that is not caused by a user based on the evaluation.

20 Claims, 5 Drawing Sheets

SYSTEM LIBRARY ERROR CLASSIFICATION IN A CLOUD BASED DYNAMIC ANALYSIS TOOL

BACKGROUND

Embodiments presented herein generally relate to software debugging, and more specifically, to classifying errors in an application that are distinctly related to a system library.

Generally, a dynamic analysis tool may be linked to an executable application for debugging purposes. The dynamic analysis tool may detect various errors that occur during execution of the application. The dynamic analysis tool instruments object code and system libraries at multiple locations to track specific information related to each error. Doing so allows the dynamic analysis tool to pinpoint relevant areas for a developer to investigate and correct. For example, if a memory error occurs, the dynamic analysis tool may report the execution location of the error (e.g., memory address where the error was detected, etc.).

Tracking system library errors is advantageous for mission critical software, where the system libraries associated with the software are not typically updated. Further, identifying system library errors allows a developer for standard applications to focus on improving user code to work with the limitations of the system library.

However, one drawback to detecting system library errors is that a dynamic analysis tool is generally unable to distinguish between system library-related errors that originate from inherent problems in the system libraries themselves and those that originate because of a developer's misuse of the system libraries. Typically, the dynamic analysis tool reports all system library-related errors without making any distinctions. Further, because errors that originate from inherent problems in system libraries can be numerous, a developer might have to sift through each reported error to identify which errors are more relevant to improving the underlying application.

SUMMARY

One embodiment presented herein discloses a method. The method generally includes monitoring, by a dynamic analysis tool executing in a first client of a plurality of clients, an execution of an application. The method also includes identifying one or more errors that are related to at least one of a plurality of system libraries called by the application during the execution. For each identified error, the dynamic analysis tool (i) evaluates the error relative to error data observed in dynamic analysis tools executing in each of the plurality of clients, and (ii) flagging the error as an error that is not caused by a user based on the evaluation.

Another embodiment presented herein discloses a computer program product that includes a non-transitory computer-readable storage medium. The computer-readable storage medium has instructions, which, when executed on a processor, performs an operation. The operation itself includes monitoring, by a dynamic analysis tool executing in a first client of a plurality of clients, an execution of an application. The operation also includes identifying one or more errors that are related to at least one of a plurality of system libraries called by the application during the execution. For each identified error, the dynamic analysis tool (i) evaluates the error relative to error data observed in dynamic analysis tools executing in each of the plurality of clients, and (ii) flagging the error as an error that is not caused by a user based on the evaluation.

Yet another embodiment presented herein discloses a system that has a processor and a memory. The memory stores code, which, when executed on the processor, performs an operation. The operation itself includes monitoring, by a dynamic analysis tool executing in a first client of a plurality of clients, an execution of an application. The operation also includes identifying one or more errors that are related to at least one of a plurality of system libraries called by the application during the execution. For each identified error, the dynamic analysis tool (i) evaluates the error relative to error data observed in dynamic analysis tools executing in each of the plurality of clients, and (ii) flagging the error as an error that is not caused by a user based on the evaluation.

DETAILED DESCRIPTION

Figure 1:
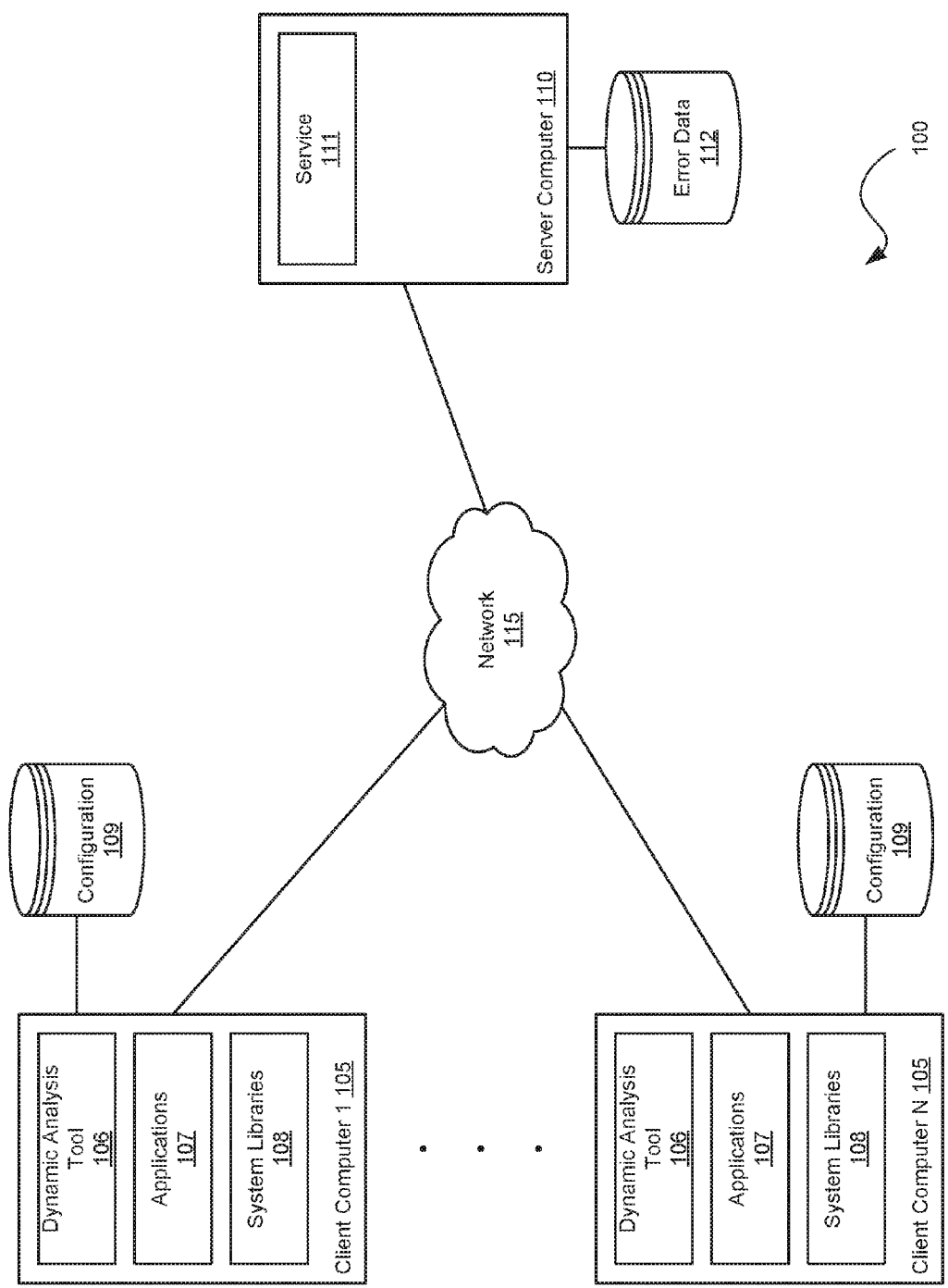
FIG. 1 illustrates an example computing environment, according to one embodiment.

Embodiments presented herein describe techniques for classifying errors related to system libraries used by an application. More specifically, embodiments provide a cloud-based approach to classifying system library-related errors identified by a dynamic analysis tool based on frequencies upon which the errors are observed in a cloud environment.

In one embodiment, the dynamic analysis tool executing on a client system detects errors during execution of a given application. For example, the dynamic analysis tool may detect errors that are based in user-defined libraries of the application and errors that are based in system routines, e.g., using various application programming interface (API) hooks to the libraries. The dynamic analysis tool may retain coverage information for the errors monitored in each hook. Further, the dynamic analysis tool may send the error data to a server in the cloud environment. The server maintains error data sent by dynamic analysis tools executing in client systems. For example, the error data may include statistics regarding system library-related errors reported by a given dynamic analysis tool, e.g., how many applications experienced a given system library-related error, whether that error was resolved in subsequent executions, etc.

In one embodiment, the dynamic analysis tool may evaluate errors observed in a current execution relative to the error data maintained by the server. Doing so allows the dynamic analysis tool to distinguish between observed system library-related errors that are due to user error (e.g., a developer incorrectly using the system library) or system library-related errors that are due to errors in the system library itself. For example, the dynamic analysis tool may determine, based on the error data maintained by the server, whether a given system library-related error occurred among other applications, and whether the amount of applications exceeds a specified threshold amount or frequency. If so, the dynamic analysis tool may flag the error as one that is not user error, because an error being observed at a given frequency may indicate that the cause is likely not due to the system library being incorrectly used by a developer.

As another example, the dynamic analysis tool may determine, based on the error data, whether a system library-related error was resolved in subsequent executions by other clients and whether the amount exceeds a specified threshold amount or frequency. If the error was resolved in a relatively large amount of clients, it is likely that the error was user-related. In turn, the dynamic analysis tool may flag the error as a system library error related to usage.

Advantageously, classifying errors relating to system routines in an executable application allows the dynamic analysis tool to present errors to a developer that can be used to improve the functionality of the program. For example, the dynamic analysis tool may filter out errors that are marked to be inherent to the system library and present the system library-related errors that are likely due to usage. As a result, user experience is also improved, as a developer does not have to manually evaluate numerous errors that cannot typically be fixed in user code. Further, the cloud-based approach allows the dynamic analysis tool to distinguish errors based on how other clients have observed and resolved the error.

FIG. 1 illustrates an example computing environment 100, according to one embodiment. As shown, computing environment 100 includes multiple client computers 1-N 105, a server computer 110, and a network 115. In one embodiment, computing environment 100 represents an enterprise network of physical computing systems interconnected by a local network 115. The computing platform may also be connected to an external network (e.g., the Internet) via the network 115.

In one embodiment, the client computers 1-N 105 includes a dynamic analysis tool 106, one or more applications 107, one or more system libraries 108, and a configuration 109. A given client computer 105 can be a physical computing system or a virtual computing instance executing in the cloud. Further, each client computer 105 may represent a workstation that allows a developer to create the applications 107, e.g., using an integrated development environment (IDE) application. Each application 107 may call several user-defined libraries as well as system libraries 108 to perform some task.

In one embodiment, the dynamic analysis tool 106 may evaluate a given application 107 for errors and bugs during runtime of that application 107. For example, the dynamic analysis tool 106 may detect memory corruption and leaks, profile performance of the application 107, and analyzing code coverage. The developer may link a given application 107 to the dynamic analysis tool 106 and execute the application 107. In turn, the dynamic analysis tool 106 instruments object code into user code and the system libraries 108. Doing so allows the dynamic analysis tool 106 to monitor, e.g., memory that that application 107 initializes, accesses, allocates, or frees within a given user or system routine and properly detect errors. The dynamic analysis tool 106 may then generate a report of observed errors and present the report to the developer. The reports may provide a description of a given error, such as whether the error is related to user code or a system library call. For each error, the report may also specify a path followed by the application 107 identifying where the error was reached. The developer may then evaluate the report to pinpoint areas in the code to improve or otherwise be aware of.

As shown, the server computer 110 includes a service 111 and error data 112. The dynamic analysis tool 106 may communicate with the server computer 110 via the service 111 and send error data for a given application 107. In turn, the service 111 receives the data from the dynamic analysis tool 106 and maintains the data (as error data 112). As such, the service 111 may maintain error data 112 from applications analyzed in dynamic analysis tools 106 of each of the client computers 1-N 105.

As further described below, the dynamic analysis tool 106 may use the error data 112 maintained by the service 111 to better distinguish observed system library 108 errors that are caused by developer error and those that are caused due to underlying issues with the system library 108. To do so, the dynamic analysis tool 106 may evaluate the system library-related errors observed during a current execution of a given application 107 relative to errors related to a particular system library as specified in the error data 112.

In another configuration, computing environment 100 may be a cloud-based enterprise networking environment. Servers in the cloud environment may host the dynamic analysis tool 106, applications 107, system libraries 108, and configuration 109 for access by the client computers 105. In such an architecture, the client computers 105 may share the system libraries 108 used by the applications 107.

Figure 2:
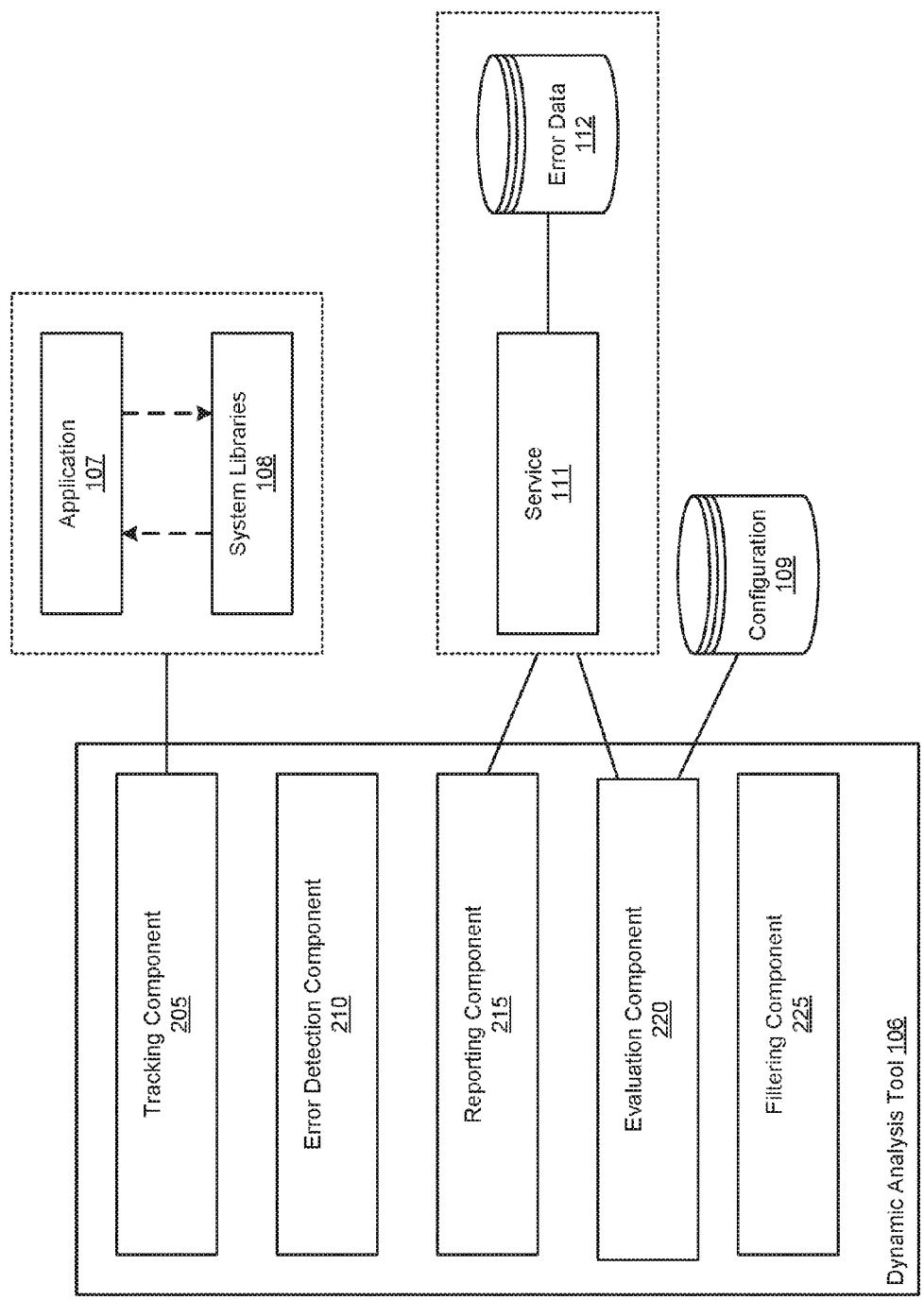
FIG. 2 illustrates an example dynamic analysis tool configured to classify system library-related errors in an executable application, according to one embodiment.

FIG. 2 illustrates an example dynamic analysis tool 106 configured to classify system library-related errors in an executable application, according to one embodiment. As shown, the dynamic analysis tool 106 includes a tracking component 205, an error detection component 210, a reporting component 215, an evaluation component 220, and a filtering component 225.

In one embodiment, the tracking component 205 may insert a variety of application programming interface (API) hooks to monitor execution at various entry points of a given application 107 and system libraries 108 called by the application 107. For example, the tracking component 205 may monitor, via the hooks, locations such as an entry and exit of a function, load and store instructions, etc. The tracking component 205 may also monitor library routines that perform a function (e.g., file open, file close, etc.). Further, the tracking component 205 may instrument object code to the user code of the application 107 and the system libraries 108.

The error detection component 210 identifies areas of executable code in the application 107 that may have errors (e.g., memory leaks, memory corruption, and the like) present. Once identified, the error detection component may capture information related to an error, such as error path, error type, system library, etc. In one embodiment, the error detection component 210 may retain error coverage information for each API hook (e.g., during the previous X amount of executions of the application 107 where that particular API hook was invoked).

The reporting component 215 presents the identified error to a user of the dynamic analysis tool 106 (e.g., a developer for the application 107). The reporting component 215 may do so by generating a list of the errors that is organized through various means, e.g., based on the type of error, level of vulnerability or risk presented by the error, etc. The developer may specify how the reporting component 215 presents the list in the configuration 109.

Further, in one embodiment, the reporting component 215 may communicate with the service 111 to send identified errors of a current execution of an application 107. In turn, the service 111 may process the error data and maintain the data in storage (as error data 112). As stated, the service 111 maintains error data for various applications 107 of the client computers 1-N 105. The service 111 may organize the error data by type of error (e.g., whether the error was in user code or a system library), whether the error was resolved in a subsequent execution, and the like. In one embodiment, the reporting component 215 may retrieve the error data 112 from the service 111.

As stated, the dynamic analysis tool 106 is configured to classify system library errors for a given application 112 as user-related (i.e., the system library error was likely caused by the user code) or related to the system library itself. In one embodiment, the evaluation component 220 may compare the system library error data generated by the reporting component 215 relative to the error data 112. The evaluation component 220 may do so based rules specified in the configuration 109. The developer may specify various approaches to classifying the system library error data as well as thresholds related to the approaches.

For example, one approach is evaluating a frequency that a particular system error is observed by different clients, as reflected in the error data 112, e.g., if the observed frequency exceeds a given threshold (e.g., the system library error is observed in over 70% of the instances indicated in the error data 112), then the evaluation component 220 may flag the particular error as a system library error that is not caused by the user. Another approach is evaluating a frequency that a particular system error is resolved in different clients as reflected in the error data 112, e.g., if the observed frequency exceeds a given threshold (e.g., the system library error is resolved in 90% of the instances), then the evaluation component 220 may flag the particular error as a system library error that is caused by the user. Such approaches are described in further detail relative to FIGS. 3 and 4. Of course, a combination of both approaches may be applied based on specifications in the configuration 109.

In one embodiment, the filtering component 225 modifies the list of errors generated by the reporting component 215 such that errors marked as system library errors that are not caused by the user do not appear on the list. Thus, when the reporting component 215 presents the list of errors to a developer, the developer sees a more meaningful list of errors to address when updating code of the application 107. Of course, the developer may specify, via the configuration 109, whether to also include the system library errors not caused by the user to appear on the list. In addition, the reporting component 215 may provide a list of the flagged errors as well as a statistical likelihood that the errors correspond to inherently system library-related errors.

Figure 3:
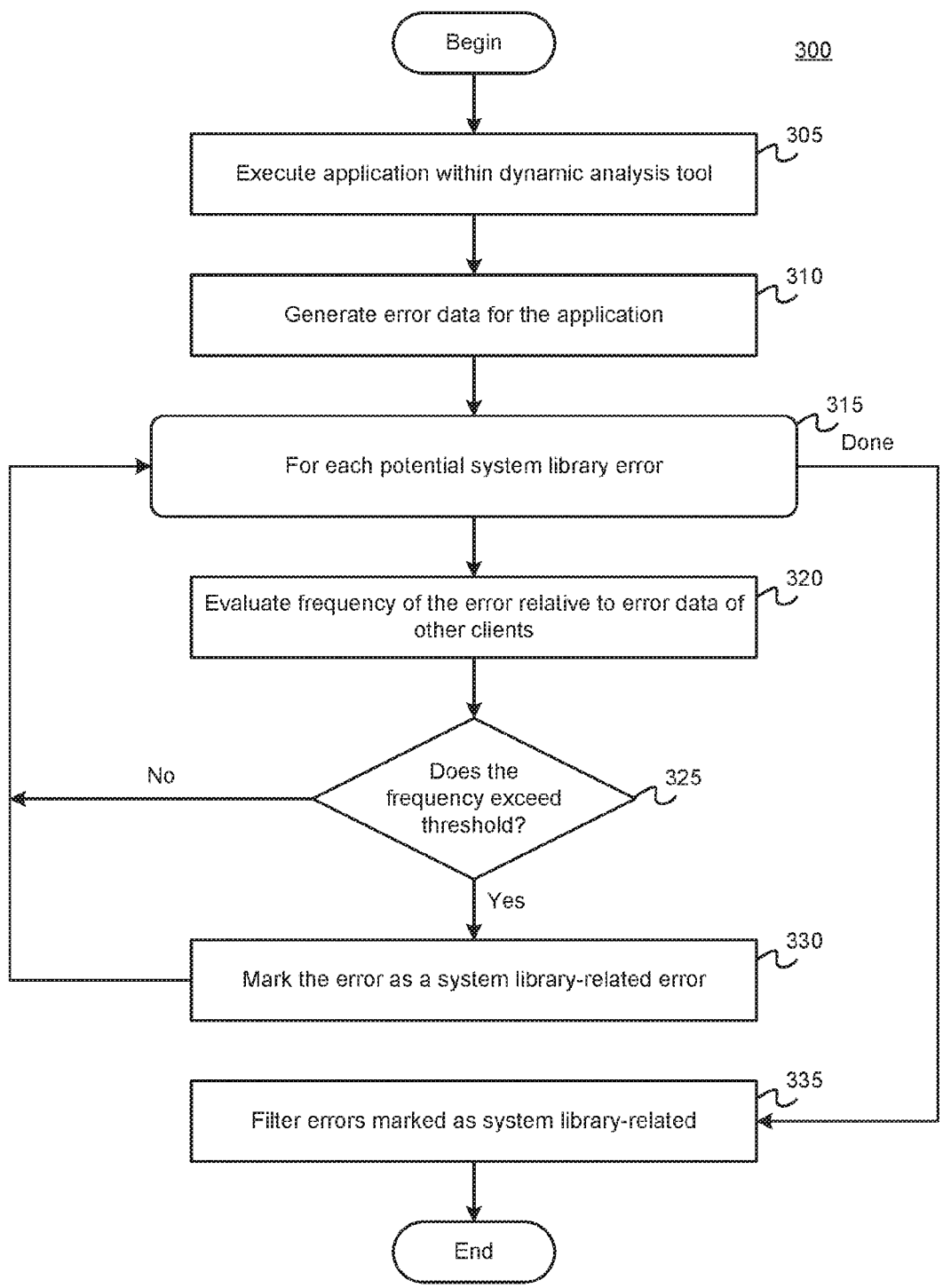
FIG. 3 illustrates a method for classifying system library-related errors of an executable application based on the frequency that an error is observed in a computing environment, according to one embodiment.

FIG. 3 illustrates a method 300 for classifying system library-related errors of an executable application based on the frequency that an error is observed in a computing environment, according to one embodiment. As shown, method 300 begins at step 305, where the dynamic analysis tool 106 executes a given application 107. The tracking component 205 may monitor runtime of the application 107 via API hooks to user-defined libraries and system libraries called in the application 107. At step 310, the error detection component 210 identifies errors during the runtime of the application 107 and generates error data. The identified errors may include potential system library errors, e.g., those errors that originate based on a call to a given system library.

At step 315, the method 300 enters a loop for each potential system library error. At step 320, the evaluation component 220 determines a frequency that the potential system library error is present in the error data 112 of other clients. To do so, the evaluation component 220 may communicate with the service 111 and query the amount of applications or clients that have experienced the particular system library error, based on the error data 112. Alternatively, the reporting component 215 may also retrieve the error data 112 so that the evaluation component 220 may query the error data 112 locally.

At step 325, the evaluation component 220 determines whether the frequency exceeds a threshold (e.g., specified in the configuration 109). If not, then method 300 returns to the beginning of the loop at step 315. Otherwise, at step 330, the evaluation component 220 flags the error as a system library-related error (i.e., an error that is likely not caused due to misuse of the system library). Once the loop is complete, at step 335, the filtering component 225 may filter errors marked as system library-related in an error list that is presented to a user, such as a developer.

In another embodiment, rather than evaluating a frequency of a given error being present for a given system library hook, the error detection component 210 may save a path that includes a specified amount of previous hooks that the execution of the application 107 followed. Rather than determine a frequency that a hook reported an error, the error detection component 210 may determine a rate that the hook reported this error when reaching the saved path. The reporting component 215 may send such information to the service 111. In turn, the service 111 may merge such data into path-based error data, which allows the service 111 to maintain a percentage of instances that the hook reported the error reached on the path.

Figure 4:
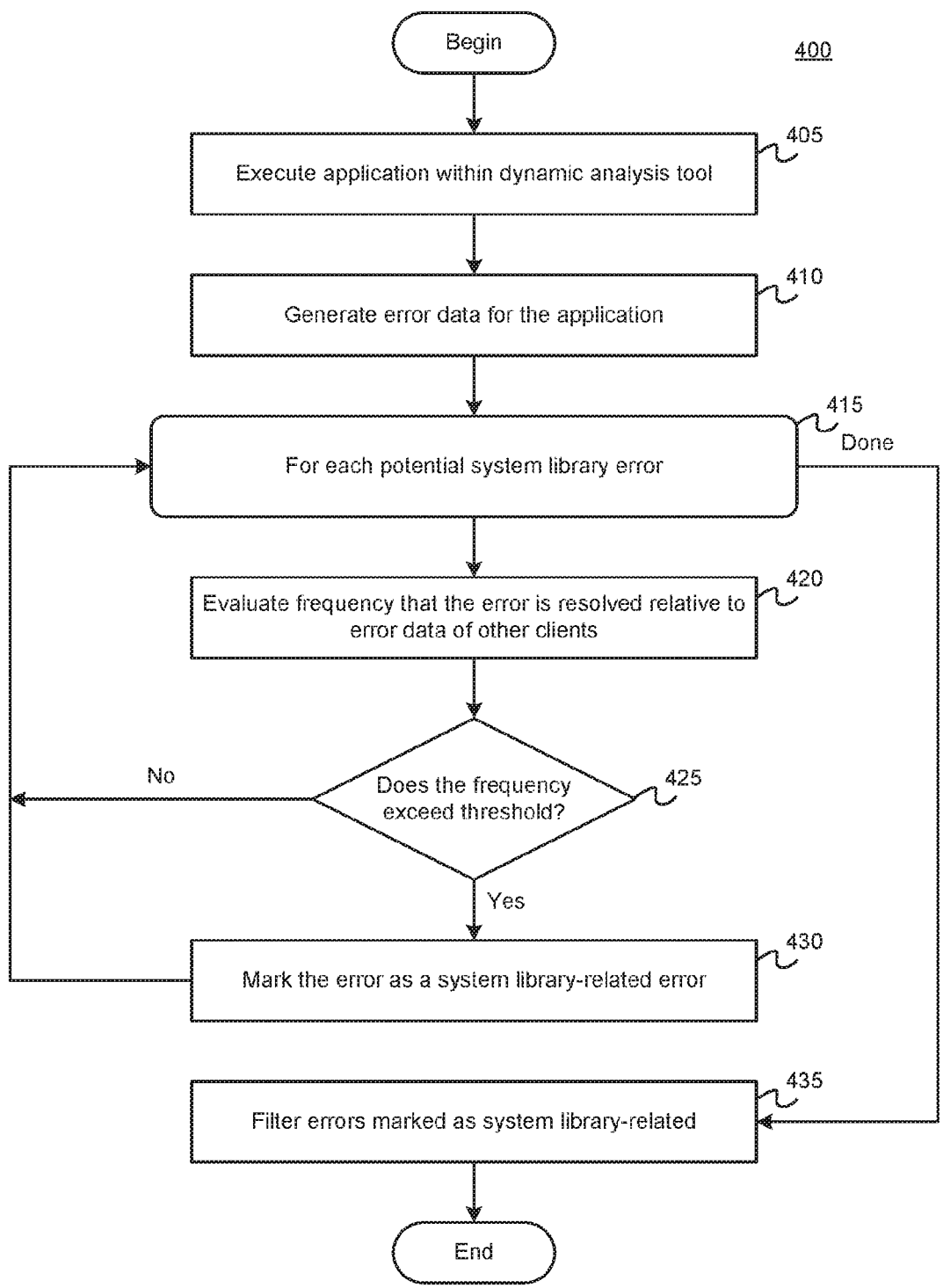
FIG. 4 illustrates a method for classifying system library-related errors of an executable application based on the frequency that an error is resolved in a computing environment, according to one embodiment.

FIG. 4 illustrates a method 400 for classifying system library-related errors of an executable application based on the frequency that an error is resolved in a computing environment, according to one embodiment. As shown, method 400 begins at step 405, where the dynamic analysis tool 106 executes a given application 107. The tracking component 205 may monitor runtime of the application 107 via API hooks to user-defined libraries and system libraries called in the application 107. At step 410, the error detection component 210 identifies errors during the runtime of the application 107 and generates error data. The identified errors may include potential system library errors, e.g., those errors that originate based on a call to a given system library.

At step 415, the method 400 enters a loop for each potential system library error. At step 420, the evaluation component 220 determines the frequency that the potential error is resolved relative to the error data 112. To do so, the evaluation component 220 may communicate with the service 111 and query the amount of applications or clients that have experienced the particular system library error and resolved the error at that same path in subsequent executions, based on the error data 112. For example, if a particular error that is detected on a given path of an API hook to a system library is resolved in subsequent executions in 90% of the time that the error is detected, the error is likely one that is a user-based. Alternatively, the reporting component 215 may also retrieve the error data 112 so that the evaluation component 220 may query the error data 112 locally.

At step 425, the evaluation component 220 determines whether the frequency exceeds a specified threshold. If not, then the method 400 returns to the beginning of the loop at step 415. Otherwise, at step 430, the evaluation component 220 flags the error as a system library-related error. Once the loop is complete, at step 435, the filtering component 225 may filter errors marked as system library-related in an error list that is presented to the developer.

Figure 5:
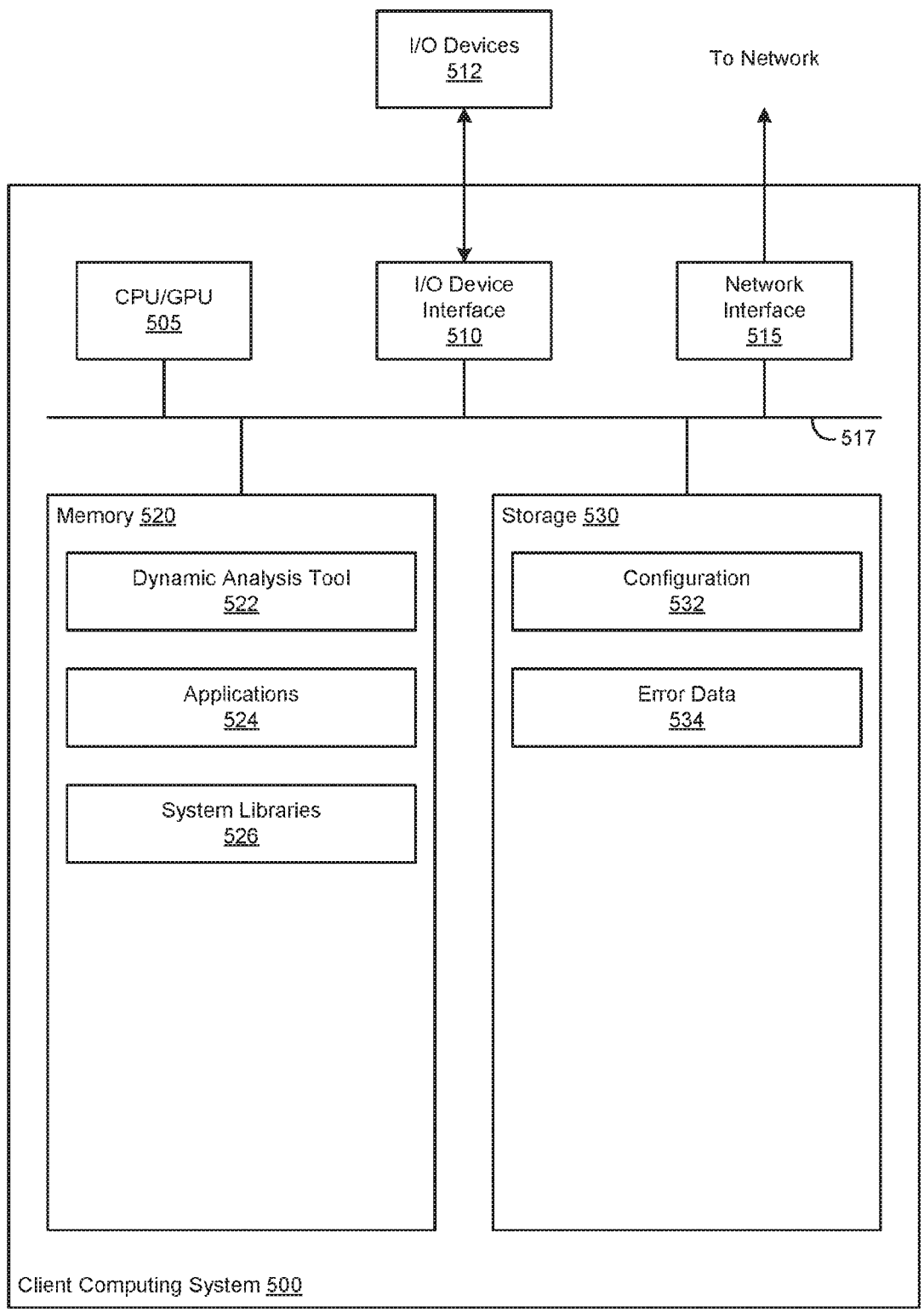
FIG. 5 illustrates an example computing system configured to classify system library-related errors in an executable application, according to one embodiment.

FIG. 5 illustrates an example client computing system 500 configured to classify system library-related errors in an executable application, according to one embodiment. As shown, the client computing system 500 includes, without limitation, a central processing unit (CPU) 505, a network interface 515, a memory 520, and storage 530, each connected to a bus 517. The client computing system 500 may also include an I/O device interface 510 connecting I/O devices 512 (e.g., keyboard, display, mouse devices, etc.) to the client computing system 500. Further, in context of the present disclosure, the computing elements shown in the computing system 500 may correspond to a physical computing system (e.g., a system in an enterprise network).

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 515, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes a dynamic analysis tool 522, one or more applications 524, and one or more system libraries 526. And storage 530 includes a configuration 532 and error data 534. The dynamic analysis tool 522 may monitor a runtime execution of an application 524 and detect errors (as error data 534) during the runtime, such as memory leaks and corruption. To do so, the dynamic analysis tool 522 instruments object code into user-defined libraries of the application 524 and the system libraries 526 used by the application 524. Further, the dynamic analysis tool 522 may classify errors as usage errors (i.e., errors due to user code) and system library-related errors. In addition, the dynamic analysis tool 522 may send the error data 534 to a server that maintains error data generated by other dynamic analysis tools (e.g., in an enterprise environment).

In one embodiment, the dynamic analysis tool 522 may further classify system library errors as errors that are likely due to a developer incorrectly using a given system library and as errors that are based on bugs or flaws of the system library itself. To do so, dynamic analysis tool 522 may evaluate the error data 534 relative to error data maintained by the server based on specified rules in the configuration 532. For example, the dynamic analysis tool 522 can determine whether a given error is observed (and/or resolved) by over a specified threshold of clients, as indicated by the error data 534. Based on the determination, the dynamic analysis tool 522 may mark the error as one that is likely caused by a user. In addition, the dynamic analysis tool 522 may filter errors marked as inherent to the system library to provide more meaningful results that a developer can review.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding description, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the dynamic analysis tool) or related data available in the cloud. For example, the dynamic analysis tool could execute on a computing system in the cloud and detect error data during runtime execution of a given software program. In such a case, the dynamic analysis tool could track the error data and store the data at a storage location in the cloud. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A method comprising:
monitoring, by a dynamic analysis tool executing in a first client of a plurality of clients, an execution of an application;
identifying one or more errors that are related to at least one of a plurality of system libraries called by the application during the execution; and
for each identified error:
evaluating the error relative to error data observed in a dynamic analysis tool executing in each of the plurality of clients, and
flagging the error as an error that is not caused by a user based on the evaluation.

2. The method of claim 1, further comprising:
filtering the errors that are marked as an error that is not caused by the user from a list of errors to generate for display.

3. The method of claim 1, wherein evaluating the error relative to the error data comprises:
   determining whether a specified threshold of the dynamic analysis tools executing in the plurality of clients observed the error.

4. The method of claim 1, wherein evaluating the error relative to the error data comprises:
   determining whether a specified threshold of the dynamic analysis tools executing in the plurality of clients observed and resolved the error.

5. The method of claim 1, wherein the application is monitored by a plurality of application programming interface (API) hooks.

6. The method of claim 5, wherein the dynamic analysis tool retains coverage information of a specified amount of previous executions at each of the API hooks.

7. The method of claim 6, wherein the dynamic analysis tool identifies the one or more errors based on the specified amount of previous executions.

8. A computer program product, comprising:
   a non-transitory computer-readable storage medium having instructions, which, when executed on a processor, perform an operation, comprising:
      monitoring, by a dynamic analysis tool executing in a first client of a plurality of clients, an execution of an application,
      identifying one or more errors that are related to at least one of a plurality of system libraries called by the application during the execution, and
      for each identified error:
         evaluating the error relative to error data observed in a dynamic analysis tool executing in each of the plurality of clients, and
         flagging the error as an error that is not caused by a user based on the evaluation.

9. The computer program product of claim 8, wherein the operation further comprises:
   filtering the errors that are marked as an error that is not caused by the user from a list of errors to generate for display.

10. The computer program product of claim 8, wherein evaluating the error relative to the error data comprises:
    determining whether a specified threshold of the dynamic analysis tools executing in the plurality of clients observed the error.

11. The computer program product of claim 8, wherein evaluating the error relative to the error data comprises:
    determining whether a specified threshold of the dynamic analysis tools executing in the plurality of clients observed and resolved the error.

12. The computer program product of claim 8, wherein the application is monitored by a plurality of application programming interface (API) hooks.

13. The computer program product of claim 12, wherein the dynamic analysis tool retains coverage information of a specified amount of previous executions at each of the API hooks.

14. The computer program product of claim 13, wherein the dynamic analysis tool identifies the one or more errors based on the specified amount of previous executions.

15. A system, comprising:
    a processor; and
    a memory storing code, which, when executed on a processor, performs an operation, comprising:
       monitoring, by a dynamic analysis tool executing in a first client of a plurality of clients, an execution of an application,
       identifying one or more errors that are related to at least one of a plurality of system libraries called by the application during the execution, and
       for each identified error:
          evaluating the error relative to error data observed in a dynamic analysis tool executing in each of the plurality of clients, and
          flagging the error as an error that is not caused by a user based on the evaluation.

16. The system of claim 15, wherein the operation further comprises:
    filtering the errors that are marked as an error that is not caused by the user from a list of errors to generate for display.

17. The system of claim 15, wherein evaluating the error relative to the error data comprises:
    determining whether a specified threshold of the dynamic analysis tools executing in the plurality of clients observed the error.

18. The system of claim 15, wherein evaluating the error relative to the error data comprises:
    determining whether a specified threshold of the dynamic analysis tools executing in the plurality of clients observed and resolved the error.

19. The system of claim 15, wherein the application is monitored by a plurality of application programming interface (API) hooks.

20. The system of claim 19, wherein the dynamic analysis tool retains coverage information of a specified amount of previous executions at each of the API hooks.

* * * * *